(12) United States Patent
Yamanashi et al.

(10) Patent No.: US 11,623,301 B2
(45) Date of Patent: Apr. 11, 2023

(54) LASER MACHINING APPARATUS AND LASER MACHINING METHOD

(71) Applicant: Amada Co., Ltd., Kanagawa (JP)

(72) Inventors: Takaaki Yamanashi, Kanagawa (JP); Koji Funaki, Kanagawa (JP); Akihiko Sugiyama, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 245 days.

(21) Appl. No.: 17/256,331

(22) PCT Filed: Jun. 13, 2019

(86) PCT No.: PCT/JP2019/023394
§ 371 (c)(1),
(2) Date: Dec. 28, 2020

(87) PCT Pub. No.: WO2020/008827
PCT Pub. Date: Jan. 9, 2020

(65) Prior Publication Data
US 2021/0260694 A1    Aug. 26, 2021

(30) Foreign Application Priority Data

Jul. 6, 2018    (JP) .............................. JP2018-128772

(51) Int. Cl.
*B23K 26/082* (2014.01)
*B23K 26/06* (2014.01)
(Continued)

(52) U.S. Cl.
CPC ........ *B23K 26/082* (2015.10); *B23K 26/0643* (2013.01); *B23K 26/0853* (2013.01);
(Continued)

(58) Field of Classification Search
CPC .. B23K 26/38; B23K 26/082; B23K 26/0853; B23K 26/0876; B23K 37/0408
See application file for complete search history.

(56) References Cited

U.S. PATENT DOCUMENTS 3,797,908 A * 3/1974 Ward ................... B23K 26/082
348/E3.007
5,571,430 A * 11/1996 Kawasaki ............ B23K 26/082
359/220.1
(Continued)

FOREIGN PATENT DOCUMENTS

DE    10 2008 053397 A1    12/2009
JP        2000-237885 A      9/2000
(Continued)

OTHER PUBLICATIONS

Extended European Search Report for corresponding EP Application No. 19831105.2, dated Aug. 5, 2021.
(Continued)

*Primary Examiner* — Thien S Tran
(74) *Attorney, Agent, or Firm* — Renner, Otto, Boisselle & Sklar, LLP

(57) ABSTRACT

A machining head emits a laser beam for cutting sheet metal of stainless steel. A moving mechanism moves the machining head relatively to a surface of the sheet metal. A beam vibrating mechanism vibrates a laser beam in a parallel direction with a cutting advancing direction of the sheet metal. In a machining condition database, a single specific vibration frequency at which cutting of the sheet metal is possible is set to a maximum moving velocity at which cutting of the sheet metal is possible, and a plurality of vibration frequencies from a maximum frequency to a minimum frequency at which cutting of the sheet metal is possible are set to a moving velocity more than or equal to a minimum moving velocity and less than the maximum moving velocity at which cutting of the sheet metal is possible.

2 Claims, 10 Drawing Sheets

(51) Int. Cl.
  *B23K 26/08* (2014.01)
  *B23K 26/38* (2014.01)
  *B23K 101/18* (2006.01)
  *B23K 103/04* (2006.01)

(52) U.S. Cl.
  CPC .......... *B23K 26/38* (2013.01); *B23K 2101/18* (2018.08); *B23K 2103/05* (2018.08)

(56) References Cited

U.S. PATENT DOCUMENTS

| | | | |
|---|---|---|---|
| 6,706,998 B2 * | 3/2004 | Cutler | B23K 26/082 219/121.72 |
| 6,706,999 B1 * | 3/2004 | Barrett | B23K 26/083 219/121.85 |
| 2005/0218128 A1 | 10/2005 | Han | |
| 2017/0291262 A1 * | 10/2017 | Ishiguro | B23K 26/0608 |

FOREIGN PATENT DOCUMENTS

| | | |
|---|---|---|
| JP | 2005-288541 A | 10/2005 |
| JP | 2007-21579 A | 2/2007 |
| JP | 2013-056372 A | 3/2013 |
| WO | 2015/156119 A1 | 10/2015 |
| WO | 2017-179642 A1 | 10/2017 |

OTHER PUBLICATIONS

International Search Report for corresponding Application No. PCT/JP2019/023394, dated Aug. 27, 2019.
Written Opinion for corresponding Application No. PCT/JP2019/023394, dated Aug. 27, 2019.
Heston, T., Shaping the Beam for the Best Cut, The Fabricator, Jan. 2017, pp. 66-67 (cited in the specification.

\* cited by examiner

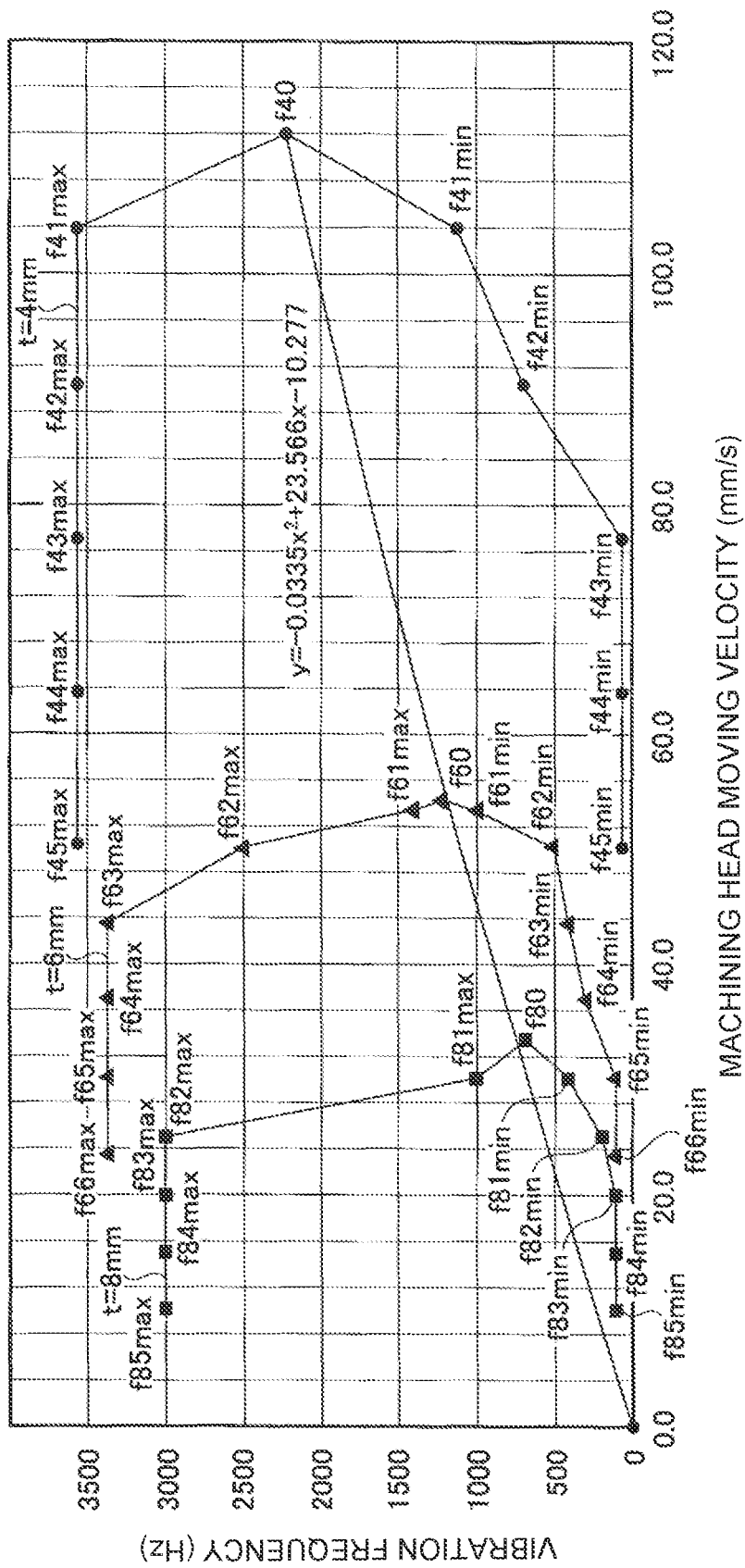

Fig. 9

| NUMBER | PLATE THICKNESS (mm) | LASER OUTPUT (W) | MACHINING SPEED (mm/min) | VIBRATION FREQUENCY Fx (Hz) | AMPLITUDE Qx (μm) | DROSS HEIGHT (mm) | SURFACE ROUGHNESS Ra UPPER PART/LOWER PART (μm) |
|---|---|---|---|---|---|---|---|
| 1 | 3 | 4000 | 12000 | 3000 | 50 | 0.1 | 2.5/4.1 |
| 2 | 6 | 4000 | 5400 | 1300 | 300 | 0.2 | 3.2/10.5 |
| 3 | 10 | 4000 | 2200 | 450 | 300 | 0.2 | 3.1/10.8 |
| 4 | 15 | 4000 | 1000 | 222 | 600 | 0.9 | 6.7/12.6 |
| 5 | 25 | 4000 | 200 | 50 | 400 | 1.5 | 4.5/36.3 |
| 6 | 3 | 2000 | 7500 | 1500 | 60 | 0.1 | 3.2/5.6 |
| 7 | 4 | 2000 | 5800 | 2000 | 150 | 0.1 | 4.1/7.3 |
| 8 | 5 | 2000 | 3800 | 1000 | 200 | 0.1 | 3.4/9.0 |
| 9 | 6 | 2000 | 2800 | 900 | 240 | 0.2 | 5.0/9.7 |
| 10 | 8 | 2000 | 1700 | 600 | 360 | 0.2 | 4.2/14.2 |
| 11 | 10 | 2000 | 900 | 250 | 400 | 0.2 | 4.7/17.6 |
| 12 | 12 | 2000 | 600 | 300 | 500 | 0.2 | 5.2/17.6 |

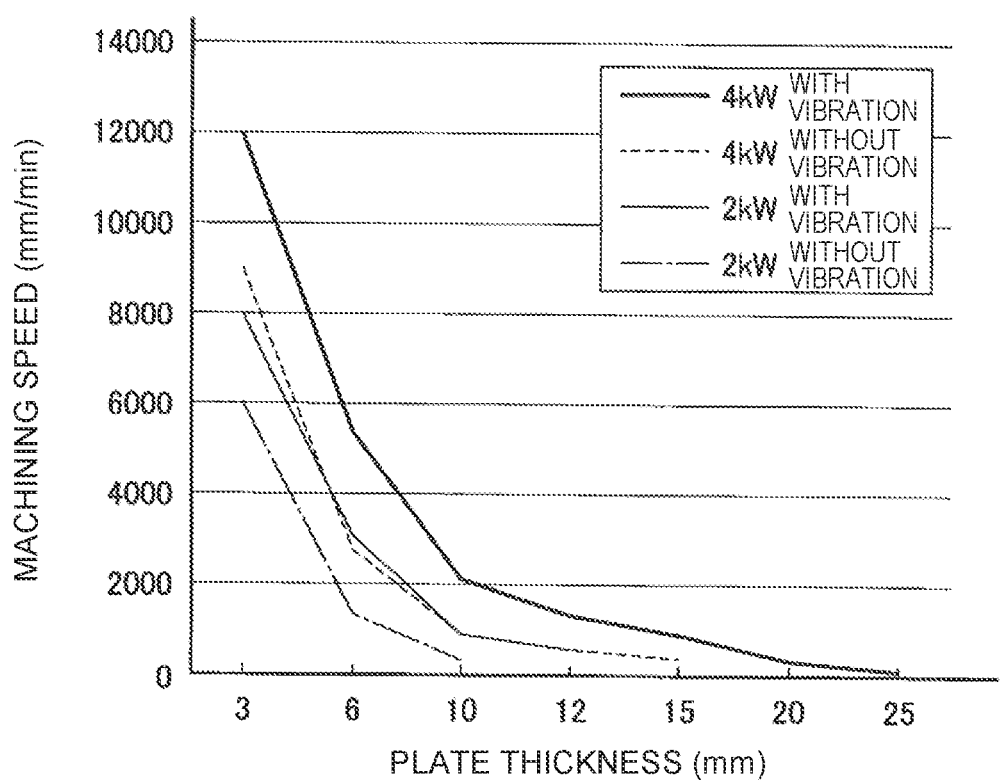

LASER MACHINING APPARATUS AND LASER MACHINING METHOD

TECHNICAL FIELD

The present disclosure relates to a laser machining apparatus and a laser machining method that machine sheet metal made of stainless steel by a laser beam.

BACKGROUND ART

Laser machining apparatuses that cut sheet metal by laser beams emitted from laser oscillators, and produce products having predetermined shapes are widely used. In recent years, as the laser oscillator that emits a laser beam used in a laser machining apparatus, a fiber laser oscillator or a direct diode laser oscillator (DDL oscillator) that is compact and low cost has been more widely used as compared with a $CO_2$ laser oscillator that is large and high cost.

The wavelength of the laser beam emitted by a $CO_2$ laser oscillator is approximately 10 μm, while the wavelength of the laser beam emitted by a fiber laser oscillator or a DDL oscillator is approximately 1 μm. Accordingly, a beam waist of the laser beam emitted by the fiber laser oscillator or a DDL oscillator is small, and a kerf width of a groove formed in a periphery of the product by irradiation of the laser beam is narrow.

CITATION LIST

Non-Patent Literature

Non-Patent Literature 1: JANUARY 2017 The FABRICATOR 67, Shaping the beam for the best cut

SUMMARY

When a laser machining apparatus cuts sheet metal made of a stainless steel of a sheet thickness of 3 mm or more by using a laser oscillator emitting a laser beam in a band of 1 μm, a focus point of the laser beam with which the sheet metal is irradiated is assumed to be located on a top surface of the sheet metal. In this case, a width of a kerf formed in the sheet metal is so narrow that molten metal cannot be discharged and machining may be defective.

Therefore, conventionally, the kerf width has been widened by bringing about a defocused state where the focus point is located above or below the top surface of the sheet metal, and the sheet metal is cut. In that case, an energy density decreases, and a cutting velocity of the sheet metal becomes low. It is conceivable to increase laser power to increase the cutting velocity, but it is not preferable to increase laser power from the viewpoint of energy saving.

Non-Patent Literature 1 describes cutting sheet metal while vibrating a laser beam in a parallel direction with a cutting advancing direction within a kerf width of the sheet metal. Hereinafter, a vibration pattern for vibrating the laser beam in the parallel direction with the cutting advancing direction will be referred to as a parallel vibration pattern.

However, Non-Patent Literature 1 does not describe a systematic consideration in a case where the parallel vibration pattern is used, though it indicates that the cutting velocity increases under a specific condition using a vibration pattern that widens the kerf width. It is required to identify a preferable condition for cutting sheet metal made of stainless steel at a high speed with a good quality of a cut surface by using a parallel vibration pattern.

According to a first aspect of one or more embodiments, a laser machining apparatus is provided, the laser machining apparatus including a machining head configured to emit a laser beam for cutting sheet metal of stainless steel, a moving mechanism configured to move the machining head relatively to a surface of the sheet metal, a beam vibrating mechanism configured to vibrate the laser beam in a parallel direction with a cutting advancing direction of the sheet metal when cutting the sheet metal by relatively moving the machining head by the moving mechanism, a database configured to store, as a machining condition, a relationship between a moving velocity at a time of relatively moving the machining head by the moving mechanism, and a vibration frequency of the laser beam by the beam vibrating mechanism, the moving velocity and the vibration frequency being obtained in advance for each plate thickness of the sheet metal, cutting of the sheet metal being possible at the moving velocity and the vibration frequency, and a control device configured to control the moving mechanism to relatively move the machining head at a moving velocity selected based on the machining condition, and control the beam vibrating mechanism to vibrate the laser beam at a vibration frequency selected based on the machining condition, wherein in the machining condition, a single specific vibration frequency at which cutting of the sheet metal is possible is set to a maximum moving velocity at which cutting of the sheet metal is possible, and a plurality of vibration frequencies from a maximum frequency to a minimum frequency at which cutting of the sheet metal is possible are set to a moving velocity more than or equal to a minimum moving velocity and less than the maximum moving velocity at which cutting of the sheet metal is possible, and the control device controls the beam vibrating mechanism to vibrate the laser beam at the specific vibration frequency when relatively moving the machining head at the maximum moving velocity, and controls the beam vibrating mechanism to vibrate the laser beam at a vibration frequency selected from the plurality of vibration frequencies from the maximum frequency to the minimum frequency, when relatively moving the machining head at any moving velocity more than or equal to the minimum moving velocity and less than the maximum moving velocity.

According to a first aspect of one or more embodiments, a laser machining method is provided, the laser machining method including emitting a laser beam for cutting sheet metal of stainless steel from a machining head and irradiating the sheet metal, cutting the sheet metal by moving the machining head relatively to a surface of the sheet metal, vibrating the laser beam in a parallel direction with a cutting advancing direction of the sheet metal when cutting the sheet metal, referring to a machining condition showing a relationship between a moving velocity at a time of relatively moving the machining head, and a vibration frequency of the laser beam, the moving velocity and the vibration frequency being obtained in advance for each plate thickness of the sheet metal, cutting of the sheet metal being possible at the moving velocity and the vibration frequency, and relatively moving the machining head at a moving velocity selected based on the referenced machining condition, and vibrating the laser beam at a vibration frequency selected based on the referenced machining condition, wherein in the machining condition, a single specific vibration frequency at which cutting of the sheet metal is possible is set to a maximum moving velocity at which cutting of the sheet metal is possible, and a plurality of vibration frequencies from a maximum frequency to a minimum frequency at which cutting of the sheet metal is possible are set to a moving velocity more than or equal to a minimum moving velocity and less than the maximum moving velocity at which cutting of the sheet metal is possible, the laser beam is vibrated at the specific vibration frequency when the machining head is relatively moved at the maximum moving velocity, and the laser beam is vibrated at a vibration frequency selected from the plurality of vibration frequencies from the maximum frequency to the minimum frequency when relatively moving the machining head at any moving velocity more than or equal to the minimum moving velocity and less than the maximum moving velocity.

According to the laser machining apparatus and the laser machining method of one or more embodiments, it is possible to cut the sheet metal made of stainless steel with good quality of the cut surface at a high speed by vibrating the laser beam in a band of 1 μm in the parallel vibration pattern.

BRIEF DESCRIPTION OF DRAWINGS

FIG. 7 is a diagram illustrating a preferable range taken by a moving velocity and a vibration frequency of a machining head at a time of cutting the sheet metal by vibrating the laser beam with a minimum amplitude amount of the parallel vibration pattern.

FIG. 9 is a diagram illustrating examples in tabular format.

FIG. 10 is a diagram illustrating a relationship between a plate thickness and a machining speed, indicating that the sheet metal can be cut at a high speed by using the parallel vibration pattern.

DESCRIPTION OF EMBODIMENT

Hereinafter, a laser machining apparatus and a laser machining method of each of embodiments will be described with reference to the accompanying drawings. A laser machining apparatus and a laser machining method of a first embodiment set an appropriate amplitude amount at a time of vibrating a laser beam in a parallel vibration pattern in order to cut sheet metal made of stainless steel of a plate thickness of 3 mm or more. A laser machining apparatus and a laser machining method of a second embodiment set an appropriate vibration frequency at a time of vibrating a laser beam in a parallel vibration pattern in order to cut sheet metal made of stainless steel of a plate thickness of 3 mm or more.

First Embodiment

Figure 1:
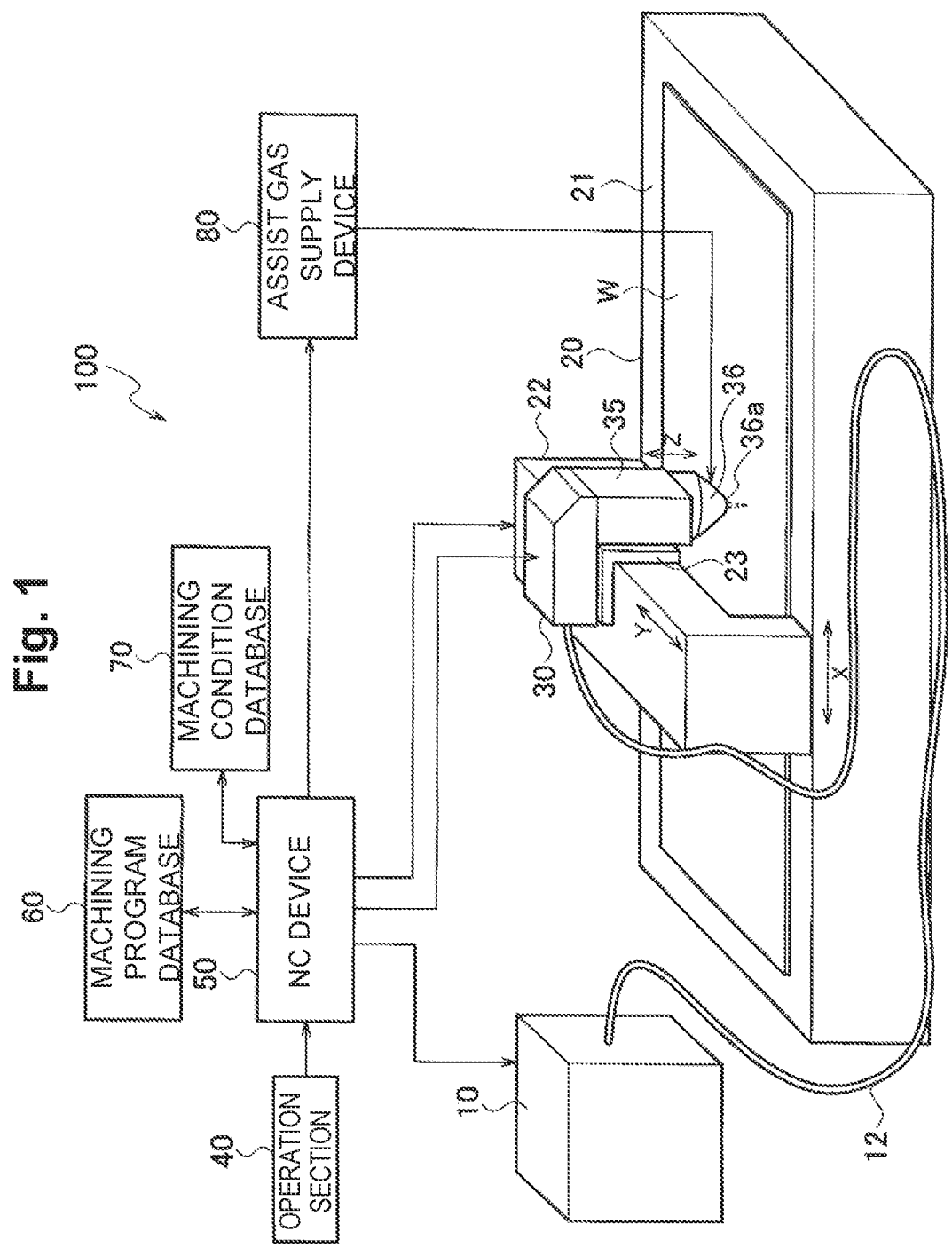
FIG. 1 is a diagram illustrating an entire configuration example of a laser machining apparatus of each of embodiments.

In FIG. 1, a laser machining apparatus 100 includes a laser oscillator 10 that generates and emits a laser beam, a laser machining unit 20, a process fiber 12 that transmits the laser beam emitted by the laser oscillator 10 to the laser machining unit 20.

Further, the laser machining apparatus 100 includes an operation section 40, a NC device 50, a machining program database 60, a machining condition database 70, and an assist gas supply device 80. The NC device 50 is an example of a control device that controls respective parts of the laser machining apparatus 100.

As the laser oscillator 10, a laser oscillator that amplifies an excitation beam emitted from a laser diode to emit a laser beam of a predetermined wavelength, or a laser oscillator that directly uses a laser beam emitted by a laser diode is preferable. The laser oscillator 10 is, for example, a solid laser oscillator, a fiber laser oscillator, a disk laser oscillator, or a direct diode laser oscillator (DDL oscillator).

The laser oscillator 10 emits a laser beam in a band of 1 μm with a wavelength of 900 nm to 1100 nm. Taking a fiber laser oscillator and a DDL oscillator as examples, the fiber laser oscillator emits a laser beam with a wavelength of 1060 nm to 1080 nm, and the DDL oscillator emits a laser beam with a wavelength of 910 nm to 950 nm.

The laser machining unit 20 has a machining table 21 where sheet metal W to be machined is placed, a gate-type X-axis carriage 22, a Y-axis carriage 23, a collimator unit 30 fixed to the Y-axis carriage 23, and a machining head 35. The sheet metal W is made of a stainless steel. In the first embodiment, a plate thickness of the sheet metal W is any of 3 mm to 25 mm.

The X-axis carriage 22 is configured to be movable in an X-axis direction on the machining table 21. The Y-axis carriage 23 is configured to be movable in a Y-axis direction perpendicular to the X-axis on the X-axis carriage 22. The X-axis carriage 22 and the Y-axis carriage 23 function as a moving mechanism that moves the machining head 35 in the X-axis direction, the Y-axis direction, or an arbitrary composition direction of an X-axis and a Y-axis, along a surface of the sheet metal W.

Instead of moving the machining head 35 along the surface of the sheet metal W, a position of the machining head 35 may be fixed, and the sheet metal W may be configured to move. The laser machining apparatus 100 can include the moving mechanism that moves the machining head 35 relatively to the surface of the sheet metal W.

To the machining head 35, a nozzle 36 that has a circular opening 36a at a tip end portion, and emits a laser beam from the opening 36a is attached. The sheet metal W is irradiated with the laser beam emitted from the opening 36a of the nozzle 36. The assist gas supply device 80 supplies, for example, nitrogen to the machining head 35 as assist gas. At a time of machining the sheet metal W, the assist gas is blown to the sheet metal W from the opening 36a. The assist gas discharges molten metal in a kerf width where the sheet metal W is melted.

Figure 2:
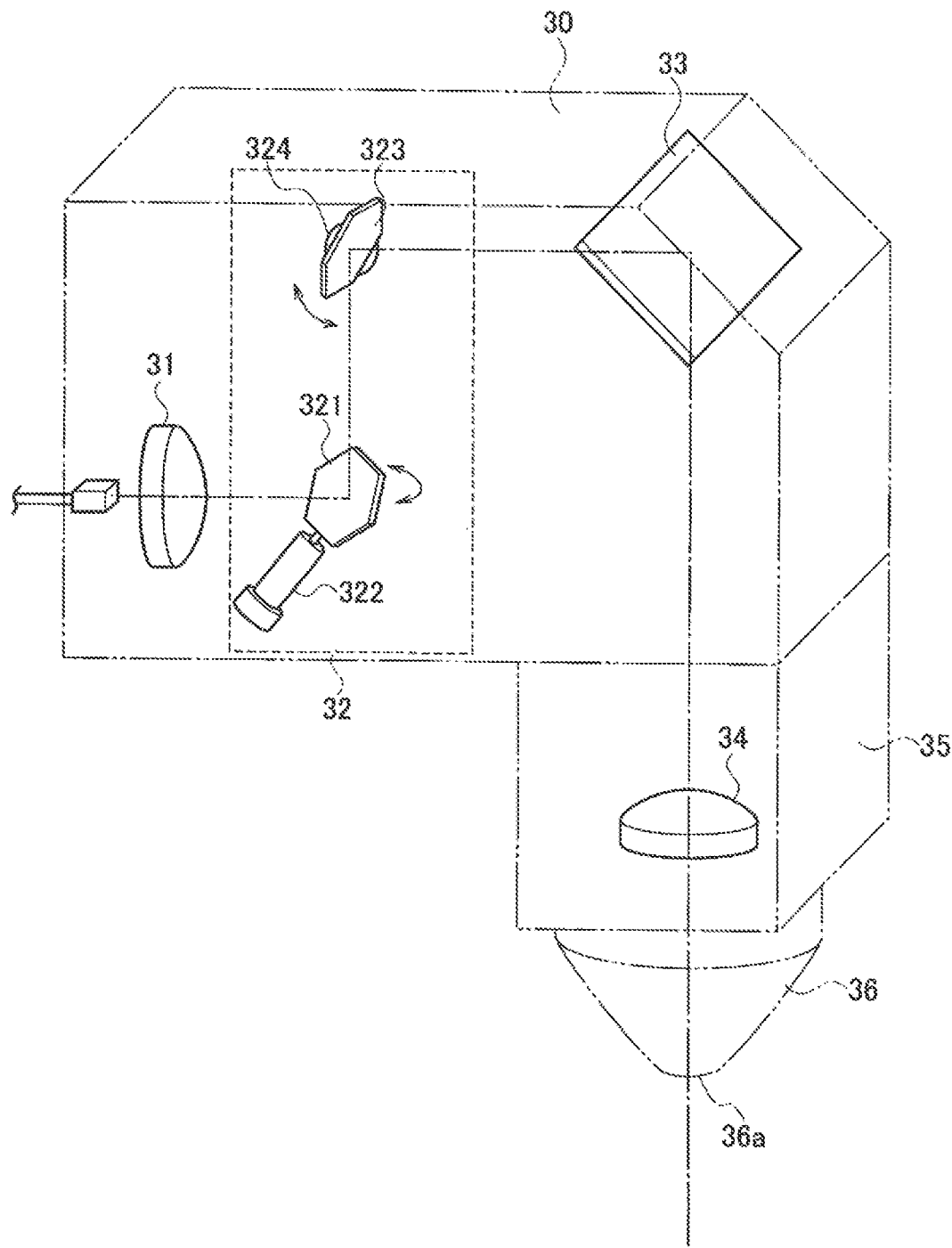
FIG. 2 is a perspective view illustrating detailed configuration examples of a collimator unit and a machining head in the laser machining apparatus of each of the embodiments.

As illustrated in FIG. 2, the collimator unit 30 includes a collimation lens 31 that converts a divergent laser beam emitted from the process fiber 12 into a parallel laser beam (collimated laser beam). Further, the collimator unit 30 includes a galvano scanner unit 32, and a bend mirror 33 that reflects a laser beam emitted from the galvano scanner unit 32 toward a lower part in a Z-axis direction perpendicular to the X-axis and the Y-axis. The machining head 35 includes a focusing lens 34 that focuses the laser beam reflected by the bend mirror 33, and irradiates the sheet metal W.

The laser machining apparatus 100 is centered so that the laser beam emitted from the opening 36a of the nozzle 36 is located at a center of the opening 36a. In a regular state, the laser beam is emitted from the center of the opening 36a. The galvano scanner unit 32 functions as a beam vibrating mechanism that vibrates the laser beam that advances in the machining head 35 and is emitted from the opening 36a, in the opening 36a. How the galvano scanner unit 32 vibrates the laser beam will be described later.

The galvano scanner unit 32 has a scanning mirror 321 that reflects the laser beam emitted from the collimation lens 31, and a drive section 322 that rotates the scanning mirror 321 to a predetermined angle. Further, the galvano scanner unit 32 has a scanning mirror 323 that reflects the laser beam emitted from the scanning mirror 321, and a drive section 324 that rotates the scanning mirror 323 to a predetermined angle.

The drive sections 322 and 324 can reciprocally vibrate the scanning mirrors 321 and 323 within a predetermined angle range respectively based on control by the NC device 50. By reciprocally vibrating either one or both of the scanning mirror 321 and scanning mirror 323, the galvano scanner unit 32 vibrates the laser beam with which the sheet metal W is irradiated.

The galvano scanner unit 32 is one example of the beam vibrating mechanism, and the beam vibrating mechanism is not limited to the galvano scanner unit 32 having a pair of scanning mirrors.

Figure 3:
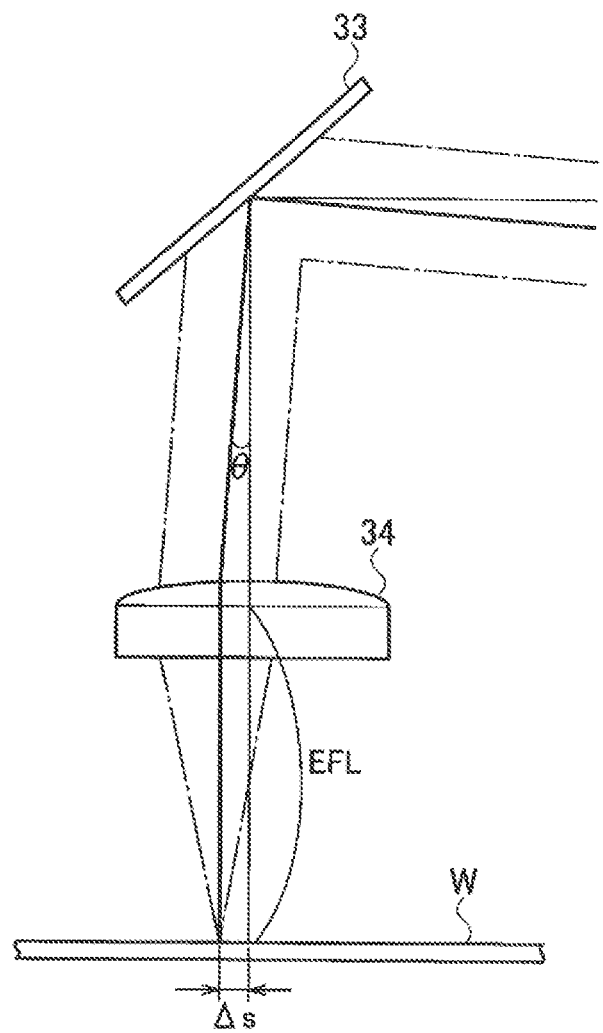
FIG. 3 is a diagram for explaining a displacement of an irradiation position of a laser beam to sheet metal by a beam vibrating mechanism.

FIG. 3 illustrates a state where either one or both of the scanning mirror 321 and the scanning mirror 323 is or are tilted, and a position of the laser beam with which the sheet metal W is irradiated is displaced. In FIG. 3, a fine solid line that is bent by the bend mirror 33 and passes through the focusing lens 34 shows an optical axis of the laser beam at the time of the regular state of the laser machining apparatus 100.

Note that, in detail, an angle of the optical axis of the laser beam that is incident on the bend mirror 33 changes by an operation of the galvano scanner unit 32 located in front of the bend mirror 33, and the optical axis deviates from a center of the bend mirror 33. In FIG. 3, for simplification, incident positions of the laser beams onto the bend mirror 33 are assumed to be same positions before and after the operation of the galvano scanner unit 32.

The optical axis of the laser beam is assumed to be displaced from the position shown by the fine solid line to a position shown by a thick solid line by the action by the galvano scanner unit 32. When the laser beam reflected by the bend mirror 33 is assumed to incline at an angle θ, an irradiation position of the laser beam on the sheet metal W is displaced by a distance Δs. When a focal length of the focusing lens 34 is EFL (Effective Focal Length), the distance Δs is calculated by EFL×sinθ.

If the galvano scanner unit 32 inclines the laser beam at the angle θ in an opposite direction to a direction shown in FIG. 3, the irradiation position of the laser beam on the sheet metal W can be displaced by the distance Δs in an opposite direction to the direction shown in FIG. 3. The distance Δs is a distance less than a radius of the opening 36a, and is preferably a distance less than or equal to a maximum distance when the maximum distance is a distance obtained by subtracting a predetermined margin from the radius of the opening 36a.

The NC device 50 can vibrate the laser beam in a predetermined direction within a plane of the sheet metal W by controlling the drive sections 322 and 324 of the galvano scanner unit 32. By vibrating the laser beam, it is possible to vibrate a beam spot formed on a surface of the sheet metal W.

In the laser machining apparatus 100 configured as above, the NC device 50 reads a machining program from the machining program database 60, and selects any of a plurality of machining conditions stored in the machining condition database 70. The NC device 50 controls the laser machining apparatus 100 to machine the sheet metal W based on the read machining program and the selected machining condition. The laser machining apparatus 100 cuts the sheet metal W by the laser beam emitted from the laser oscillator 10 and produces a product having a predetermined shape.

Figure 4:
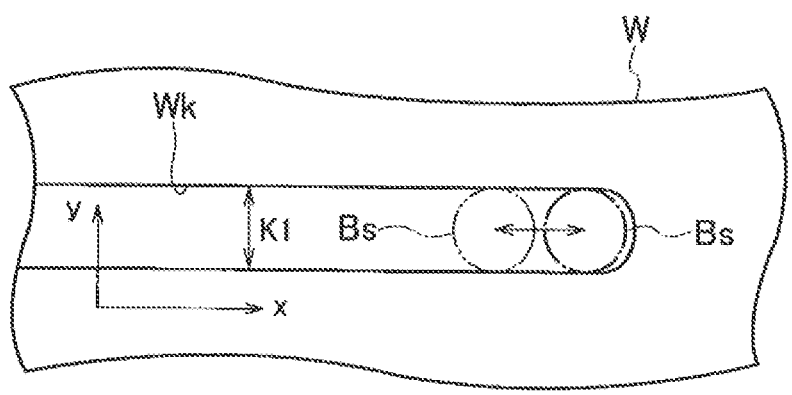
FIG. 4 is a diagram illustrating a parallel vibration pattern of the laser beam.

The galvano scanner unit 32 vibrates the laser beam as illustrated in FIG. 4. A cutting advancing direction of the sheet metal W is set as an x-direction, and a direction orthogonal to the x-direction within the plane of the sheet metal W is set as a y-direction. FIG. 4 shows a vibration pattern in a state where the machining head 35 is not moved in the x-direction to make it easier to understand the vibration pattern.

As illustrated in FIG. 4, the galvano scanner unit 32 vibrates a beam spot Bs in the x-direction within a groove Wk formed by advancement of the beam spot Bs, based on the control by the NC device 50. The vibration pattern is referred to as a parallel vibration pattern. In reality, the laser beam is vibrated in the parallel vibration pattern while the machining head 35 is moving in the cutting advancing direction.

When a frequency at which the beam spot Bs is vibrated in the parallel direction with the cutting advancing direction is Fx, and a frequency at which the beam spot Bs is vibrated in a direction orthogonal to the cutting advancing direction is Fy, the parallel vibration pattern is a vibration pattern in which Fx:Fy is 1:0. The kerf width K1 of the groove Wk is same as a kerf width at a time when the beam spot Bs is not vibrated in the parallel vibration pattern.

Figure 5:
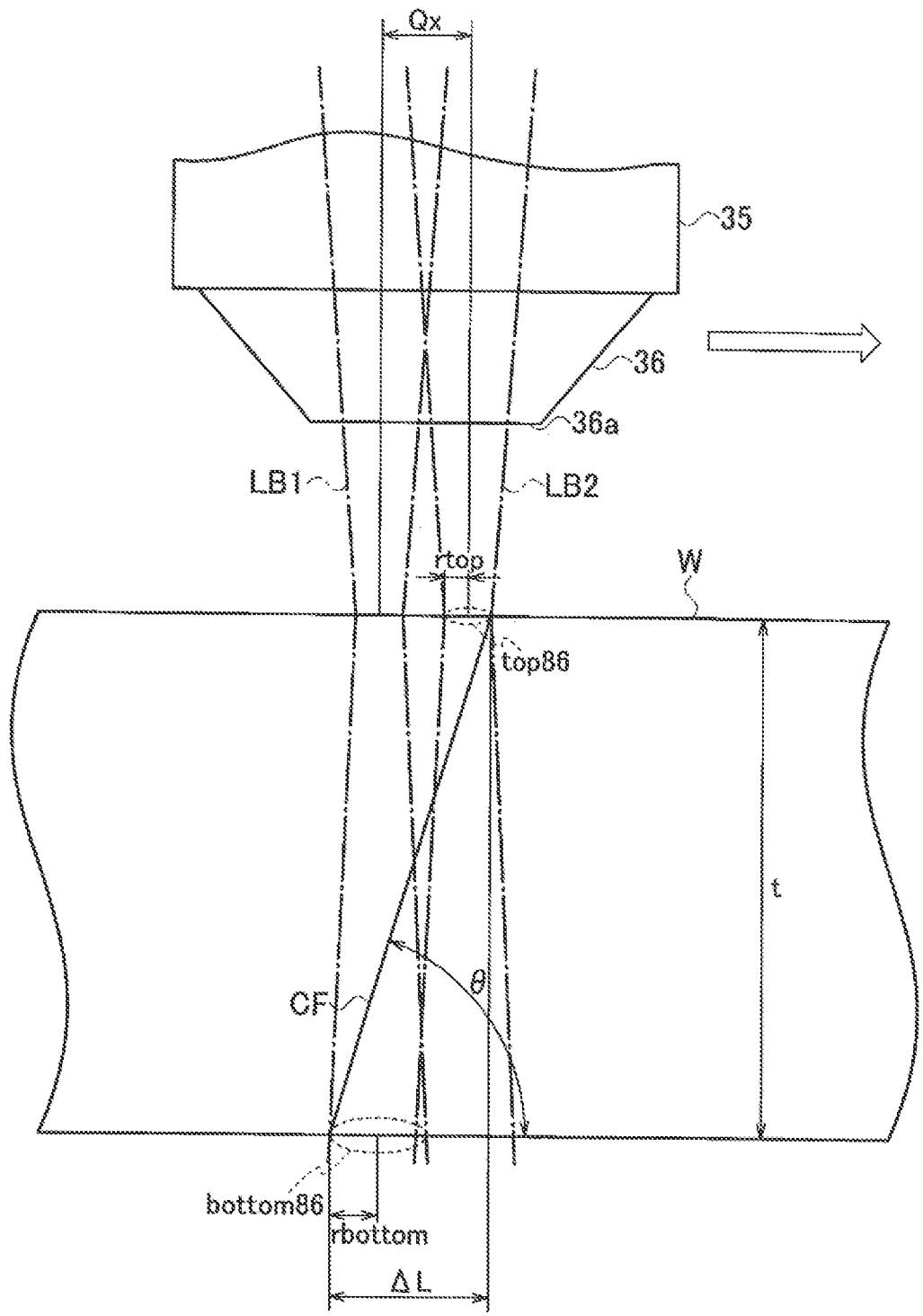
FIG. 5 is a diagram for explaining how to determine an appropriate range of an amplitude amount at a time of vibrating the laser beam in the parallel vibration pattern.

Next, it is examined in what range an amplitude amount should be set when the laser beam is vibrated in the parallel pattern by using FIG. 5. In FIG. 5, the laser machining apparatus 100 cuts the sheet metal W while moving the machining head 35 in the cutting advancing direction shown by a white arrow, and while vibrating the laser beam with which the sheet metal W is irradiated in the parallel vibration pattern.

Reference signs LB1 and LB2 respectively denote laser beams in positions that are displaced to a rearmost side and a frontmost side with respect to the cutting advancing direction. The laser beams vibrate with an amplitude amount Qx in the cutting advancing direction.

The amplitude amount Qx is an interval between focus positions of the laser beams LB1 and LB2 on the sheet metal W. In the first embodiment and the second embodiment described later, it is not necessary to bring the laser beam into a defocused state as in the conventional case, and the laser beam may be brought into a just focus state where a focus point is located on a top surface or in a vicinity of the top surface of the sheet metal.

However, use of the defocused state is not excluded. When the plate thickness of the sheet metal W is thicker than 8 mm, defocusing in a so-called in-focus state that focuses on an inside of the kerf may be used to discharge molten metal favorably.

When a conventional laser machining apparatus cuts the sheet metal W without vibrating the laser beam in a band of 1 μm in the parallel vibration pattern, machining defects are likely to occur because the molten metal in the kerf with a narrow width is cooled in a short time period and viscosity thereof increases to make the molten metal difficult to discharge.

In order to cut the sheet metal W, it is necessary to supply the sheet metal W with sufficient and intermittent energy necessary to satisfy the following two requirements. As a first requirement, the metal is melted within an irradiation time period of one time of a vibrating laser beam, and the molten metal is irradiated with the vibrating laser beam a plurality of times within a time period until the molten metal is discharged to keep a molten state (viscosity in particular). As a second requirement, a cut surface (inner surface of the kerf) is not excessively melted.

In the first embodiment, by vibrating the laser beam in the parallel vibration pattern, the above described two requirements are satisfied, and the state where the viscosity of the molten metal is low is maintained for a longer time period than in a conventional art. Accordingly, even when the kerf width K1 is same as a conventional kerf width, the molten metal in the kerf is easily discharged, and therefore quality of the cut surface becomes good.

Of the sectional area in each of the positions in the advancing direction of the laser beam, a region that actually contributes to melting of the metal is a circular region having an area that occupies substantially 86% light energy at a center side of total light energy in the sectional area. On the top surface of the sheet metal W, a circular region top 86 having an area that occupies 86% light energy at the center side of the sectional area (that is, an area of the beam spot Bs) of the laser beam on the top surface melts the sheet metal W. On a bottom surface of the sheet metal W, a circular region bottom 86 having an area that occupies 86% light energy at the center side of the sectional area of the laser beam on the bottom surface melts the sheet metal W.

As illustrated in FIG. 5, a distance in a direction along the surface of the sheet metal W of a cutting front CF is set as $\Delta L$. An angle $\theta$ of the cutting front CF is substantially 85°, and therefore the angle $\theta$ can be considered to be 85°. The distance $\Delta L$ is obtained by dividing a plate thickness t of the sheet metal W by $\tan\theta$.

Figure 6A:
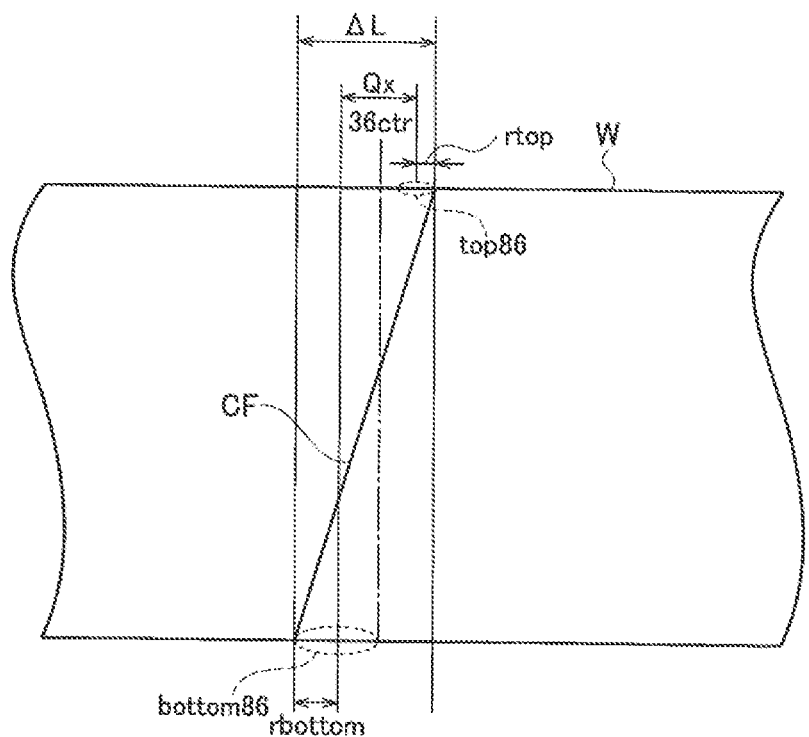
FIG. 6A is a diagram illustrating a state where the amplitude amount of the laser beam is minimum.

FIG. 6A shows a state where the amplitude amount Qx is minimum. FIG. 5 corresponds to the state in FIG. 6A. At this time, the distance $\Delta L$ can be expressed by expression (1) by using the amplitude amount Qx, a radius rbottom of the circular region bottom 86, and a radius rtop of the circular region top 86. Reference sign 36 ctr in FIG. 6A and FIG. 6B denotes a center of the nozzle 36.

$$\Delta L = Qx + \text{rbottom} + \text{rtop} \quad (1)$$

Figure 6B:
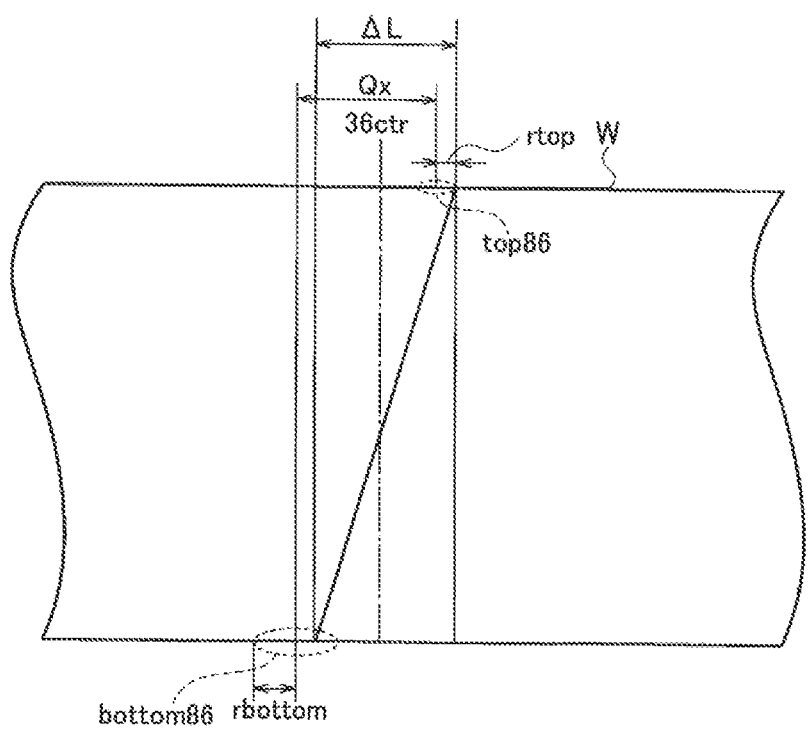
FIG. 6B is a diagram illustrating a state where the amplitude amount of the laser beam is maximum.

FIG. 6B illustrates a state where the amplitude amount Qx is maximum. A distance from a center of the circular region bottom 86 to a lower end portion of the cutting front CF is equal to the radius rtop. Accordingly, the distance $\Delta L$ in FIG. 6B is equal to the amplitude amount Qx.

Accordingly, a range which the amplitude amount Qx should take can be expressed by expression (2).

$$\Delta L - \text{bottom} - \text{rtop} \leq Qx \leq \Delta L - \quad (2)$$

When the NC device 50 vibrates the laser beam so as to satisfy expression (2) by the galvano scanner unit 32, it is possible to irradiate the entire cutting front CF with the laser beam, and it is possible to cut the sheet metal W favorably. The thicker the plate thickness t, the longer the distance $\Delta L$, and therefore, it is necessary to make the amplitude amount Qx larger as the plate thickness t becomes thicker.

The angle $\theta$ of the cutting front CF may be a Brewster's angle that is an angle at which an energy absorption rate of metal is highest, or may not be the Brewster's angle. As the requirements for metal to melt within an irradiation time period of the vibrating laser beam of one time, the Brewster's angle is not essential. It is suitable if a relationship between the energy density and the time period required for metal to melt is established within the irradiation time period of one time. Further, from a relationship between the viscosity of the molten metal and the angle $\theta$ of the cutting front CF, the molten metal can just flow down.

As described above, according to the laser machining apparatus and the laser machining method of the first embodiment, it is possible to cut the sheet metal made of a stainless steel with a plate thickness of 3 mm or more by selecting the amplitude amount at the time of vibrating the laser beam in the parallel vibration pattern in an appropriate range.

Second Embodiment

A configuration of the laser machining apparatus of the second embodiment is same as the laser machining apparatus 100 illustrated in FIG. 1. In the second embodiment, it is examined in what range a vibration frequency at a time of vibrating a laser beam in a parallel vibration pattern should be set.

According to verification of the present inventor, it has become obvious that a range of the vibration frequency in which cutting of the sheet metal W is possible exists according to a moving velocity (machining speed of a sheet metal W) of a machining head 35 at a time of cutting the sheet metal W. Further, it has become obvious that the range of the vibration frequency in which cutting of the sheet metal W is possible differs according to a plate thickness t.

Figure 8:
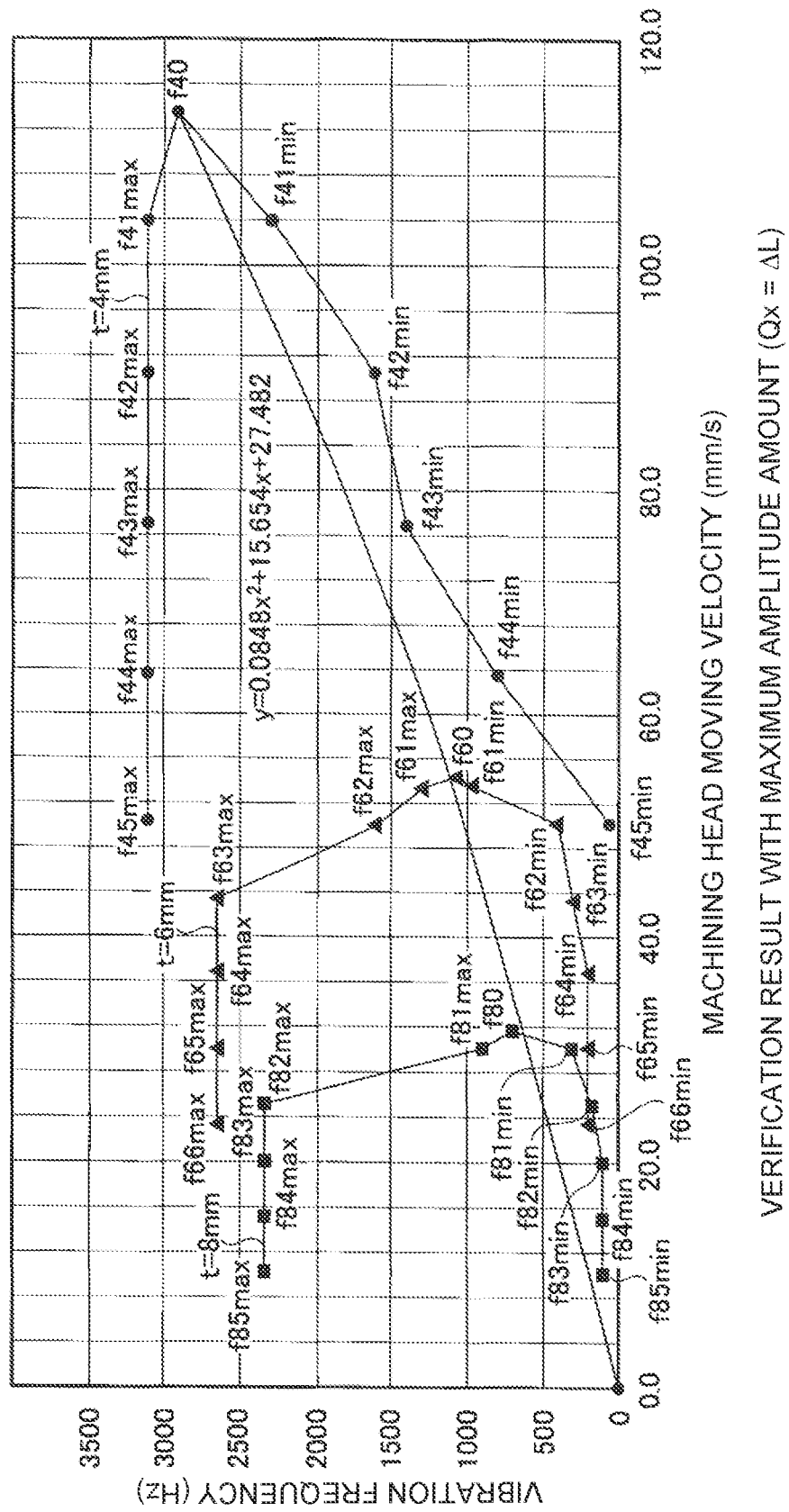
FIG. 8 is a diagram illustrating a preferable range taken by the moving velocity and the vibration frequency of the machining head at a time of cutting the sheet metal by vibrating the laser beam with a maximum amplitude amount of the parallel vibration pattern.

FIG. 7 shows a preferable range taken by the moving velocity and the vibration frequency when the sheet metal W is cut by vibrating the laser beam with a minimum amplitude amount Qx based on expression (2), that is, Qx=$\Delta L$−rbottom−rtop. FIG. 7 and FIG. 8 described later show experimental results when a fiber laser oscillator is used as a laser oscillator 10, laser power is set at 2 kW, and stainless steel of 4 mm, 6 mm, and 8 mm are cut as the sheet metal W.

When the plate thickness t is 4 mm, a maximum moving velocity is 111.7 mm/s, and a vibration frequency f40 that is selectable when the maximum moving velocity is 111.7 mm/s is only 2200 Hz.

A maximum frequency f41max and a minimum frequency f41min that are selectable when the moving velocity is 103.3 mm/s are respectively 3560 Hz and 1100 Hz. When the moving velocity is 103.3 mm/s, any vibration frequency in a range of 1100 Hz to 3560 Hz is selectable. A maximum frequency f42max and a minimum frequency f42min that are selectable when the moving velocity is 90.0 mm/s are respectively 3560 Hz and 700 Hz. When the moving velocity is 90.0 mm/s, any vibration frequency in a range of 700 Hz to 3560 Hz is selectable.

A maximum frequency f43max and a minimum frequency f43min that are selectable when the moving velocity is 76.7 mm/s are respectively 3560 Hz and 50 Hz. A maximum frequency f44max and a minimum frequency f44min that are selectable when the moving velocity is 63.3 mm/s are respectively 3560 Hz and 50 Hz. A maximum frequency f45max and a minimum frequency f45min that are selectable when the moving velocity is 50.0 mm/s are respectively 3560 Hz and 50 Hz. When the moving velocity is 76.7 mm/s to 50.0 mm/s, any vibration frequency in a range of 50 Hz to 3560 Hz is selectable.

When the plate thickness t is 6 mm, a maximum moving velocity is 54.2 mm/s, and a vibration frequency f60 selectable when the maximum moving velocity is 54.2 mm/s is only 1200 Hz.

A maximum frequency f61max and a minimum frequency f61min that are selectable when the moving velocity is 53.3 mm/s are respectively 1400 Hz and 1000 Hz. When the moving velocity is 53.3 mm/s, any vibration frequency in a range of 1000 Hz to 1400 Hz is selectable. A maximum frequency f62max and a minimum frequency f62min that are selectable when the moving velocity is 50.0 mm/s are respectively 2490 Hz and 500 Hz. When the moving velocity is 50.0 mm/s, any vibration frequency in a range of 500 Hz to 2490 Hz is selectable.

A maximum frequency f63max and a minimum frequency f63min that are selectable when the moving velocity is 43.3 mm/s are respectively 3360 Hz and 400 Hz. When the moving velocity is 43.3 mm/s, any vibration frequency in a range of 400 Hz to 3360 Hz is selectable. A maximum frequency f64max and a minimum frequency f64min that are selectable when the moving velocity is 36.7 mm/s are respectively 3360 Hz and 300 Hz. When the moving velocity is 36.7 mm/s, any vibration frequency in a range of 300 Hz to 3360 Hz is selectable.

A maximum frequency f65max and a minimum frequency f65min that are selectable when the moving velocity is 30.0 mm/s are respectively 3360 Hz and 100 Hz. A maximum frequency f66max and a minimum frequency f66min that are selectable when the moving velocity is 23.3 mm/s are respectively 3360 Hz and 100 Hz. When the moving velocity is 30.0 mm/s to 23.3 mm/s, any vibration frequency in a range of 100 Hz to 3360 Hz is selectable.

When the plate thickness t is 8 mm, a maximum moving velocity is 33.3 mm/s, and a vibration frequency f80 selectable when the maximum moving velocity is 33.3 mm/s is only 700 Hz.

A maximum frequency f81max and a minimum frequency f81min that are selectable when the moving velocity is 30.0 mm/s are respectively 1000 Hz and 400 Hz. When the moving velocity is 30.0 mm/s, any vibration frequency in a range of 400 Hz to 1000 Hz is selectable. A maximum frequency f82max and a minimum frequency f82min that are selectable when the moving velocity is 25.0 mm/s are respectively 3020 Hz and 200 Hz. When the moving velocity is 25.0 mm/s, any vibration frequency in a range of 200 Hz to 3020 Hz is selectable.

A maximum frequency f83max and a minimum frequency f83min that are selectable when the moving velocity is 20.0 mm/s are respectively 3020 Hz and 100 Hz. A maximum frequency f84max and a minimum frequency f84min that are selectable when the moving velocity is 15.0 mm/s are respectively 3020 Hz and 100 Hz. A maximum frequency f85max and a minimum frequency f85min that are selectable when the moving velocity is 10.0 mm/s are respectively 3020 Hz and 100 Hz. When the moving velocity is 20.0 mm/s to 10.0 mm/s, any vibration frequency in a range of 100 Hz to 3020 Hz is selectable.

In FIG. 7, the maximum frequencies f41max to f45max, f63max to f66max, and f82max to f85max respectively have constant values, because there is a limit to the frequency at which the scanning mirrors 321 and 323 are physically vibrated by the galvano scanner unit 32. Since the amplitude amount Qx has to be made larger as the plate thickness t becomes thicker as described above, the maximum frequency as the physical limit becomes lower as the plate thickness t becomes thicker.

When an upper limit of the physical frequency at which the scanning mirrors 321 and 323 are vibrated becomes high due to technological improvement of the galvano scanner unit 32, a maximum frequency at which cutting of the sheet metal W is possible within a physical maximum frequency of the scanning mirrors 321 and 323 can be obtained.

As illustrated in FIG. 7, the vibration frequencies f40, f60, and f80 at the time of the maximum moving velocities in the plate thicknesses t of 4 mm, 6 mm, and 8 mm are located on an approximate expression shown in expression (3), where the moving velocity on a horizontal axis is x, and the vibration frequency on the vertical axis is y.

$$y = -0.0335x^2 + 23.566x - 10.277 \quad (3)$$

When the plate thickness t is a plate thickness other than 4 mm, 6 mm, and 8 mm, the NC device 50 can calculate, based on expression (3), a vibration frequency selectable at the time of the maximum moving velocity.

FIG. 8 shows a preferable range taken by the moving velocity and the vibration frequency when the sheet metal W is cut by vibrating the laser beam with a maximum amplitude amount Qx based on expression (2), that is, Qx=ΔL.

When the plate thickness t is 4 mm, a maximum moving velocity is 113.3 mm/s, and a vibration frequency f40 that is selectable when the maximum moving velocity is 113.3 mm/s is only 2900 Hz.

A maximum frequency f41max and a minimum frequency f41min that are selectable when the moving velocity is 103.3 mm/s are respectively 3120 Hz and 2300 Hz. When the moving velocity is 103.3 mm/s, any vibration frequency in a range of 2300 Hz to 3120 Hz is selectable. A maximum frequency f42max and a minimum frequency f42min that are selectable when the moving velocity is 90.0 mm/s are respectively 3120 Hz and 1600 Hz. When the moving velocity is 90.0 mm/s, any vibration frequency in a range of 1600 Hz to 3120 Hz is selectable.

A maximum frequency f43max and a minimum frequency f43min that are selectable when the moving velocity is 76.7 mm/s are respectively 3120 Hz and 1400 Hz. When the moving velocity is 76.7 mm/s, any vibration frequency in a range of 1400 Hz to 3120 Hz is selectable. A maximum frequency f44max and a minimum frequency f44min that are selectable when the moving velocity is 63.3 mm/s are respectively 3120 Hz and 800 Hz. When the moving velocity is 63.3 mm/s, any vibration frequency in a range of 800 Hz to 3120 Hz is selectable.

A maximum frequency f45max and a minimum frequency f45min that are selectable when the moving velocity is 50.0 mm/s are respectively 3120 Hz and 50 Hz. When the moving velocity is 50.0 mm/s, any vibration frequency in a range of 50 Hz to 3120 Hz is selectable.

When the plate thickness t is 6 mm, a maximum moving velocity is 54.2 mm/s, and a vibration frequency f60 selectable when the maximum moving velocity is 54.2 mm/s is only 1050 Hz.

A maximum frequency f61max and a minimum frequency f61min that are selectable when the moving velocity is 53.3 mm/s are respectively 1300 Hz and 900 Hz. When the moving velocity is 53.3 mm/s, any vibration frequency in a range of 900 Hz to 1300 Hz is selectable. A maximum frequency f62max and a minimum frequency f62min that are selectable when the moving velocity is 50.0 mm/s are respectively 1600 Hz and 400 Hz. When the moving velocity is 50.0 mm/s, any vibration frequency in a range of 400 Hz to 1600 Hz is selectable.

A maximum frequency f63max and a minimum frequency f63min that are selectable when the moving velocity is 43.3 mm/s are respectively 2670 Hz and 300 Hz. When the moving velocity is 43.3 mm/s, any vibration frequency in a range of 300 Hz to 2670 Hz is selectable.

A maximum frequency f64max and a minimum frequency f64min that are selectable when the moving velocity is 36.7 mm/s are respectively 2670 Hz and 200 Hz. A maximum frequency f65max and a minimum frequency f65min that are selectable when the moving velocity is 30.0 mm/s are respectively 2670 Hz and 200 Hz. A maximum frequency f66max and a minimum frequency f66min that are selectable when the moving velocity is 23.3 mm/s are respectively 2670 Hz and 200 Hz. When the moving velocity is 36.7 mm/s to 23.3 mm/s, any vibration frequency in a range of 200 Hz to 2670 Hz is selectable.

When the plate thickness t is 8 mm, a maximum moving velocity is 31.7 mm/s, and a vibration frequency f80 that is selectable when the maximum moving velocity is 31.7 mm/s is only 700 Hz.

A maximum frequency f81max and a minimum frequency f81min that are selectable when the moving velocity is 30.0 mm/s are respectively 900 Hz and 300 Hz. When the moving velocity is 30.0 mm/s, any vibration frequency in a range of 300 Hz to 900 Hz is selectable. A maximum frequency f82max and a minimum frequency f82min that are selectable when the moving velocity is 25.0 mm/s are respectively 2360 Hz and 150 Hz. When the moving velocity is 25.0 mm/s, any vibration frequency in a range of 150 Hz to 2360 Hz is selectable.

A maximum frequency f83max and a minimum frequency f83min that are selectable when the moving velocity is 20.0 mm/s are respectively 2360 Hz and 100 Hz. A maximum frequency f84max and a minimum frequency f84min that are selectable when the moving velocity is 15.0 mm/s are respectively 2360 Hz and 100 Hz. A maximum frequency f85max and a minimum frequency f85min that are selectable when the moving velocity is 10.0 mm/s are respectively 2360 Hz and 100 Hz. When the moving velocity is 20.0 mm/s to 10.0 mm/s, any vibration frequency in a range of 100 Hz to 2360 Hz is selectable.

In FIG. 8, the maximum frequencies f41max to f45max, f63max to f66max, and f82max to f85max respectively have constant values for a same reason as in FIG. 7. Similarly, when the upper limit of the physical frequency at which the scanning mirrors 321 and 323 are vibrated becomes high due to technological improvement of the galvano scanner unit 32, a maximum frequency at which cutting of the sheet metal W is possible within a physical maximum frequency of the scanning mirrors 321 and 323 can be obtained.

As illustrated in FIG. 8, the vibration frequencies f40, f60, and f80 at the time of the maximum moving velocities in the plate thicknesses t of 4 mm, 6 mm, and 8 mm are located on an approximate expression shown in expression (4), where the moving velocity on a horizontal axis is x, and the vibration frequency on a vertical axis is y.

$$y=0.0848x^2+15.654x+27.482 \quad (4)$$

When the plate thickness t is a plate thickness other than 4 mm, 6 mm, and 8 mm, the NC device 50 can calculate, based on expression (4), a vibration frequency selectable at the time of the maximum moving velocity.

As is known from FIG. 7 and FIG. 8, the preferable range at the time of cutting the sheet metal W determined by the moving velocity of the machining head 35 and the vibration frequency is determined by the amplitude amount Qx at the time of the galvano scanner unit 32 vibrating the laser beam in the cutting advancing direction. The range determined by the moving velocity and the vibration frequency at which cutting of the sheet metal W is possible is experimented in advance for each of a plurality of amplitude amounts Qx from minimum to maximum, and can be stored in the machining condition database 70 as the machining condition.

When the amplitude amount Qx is fixed to the single amplitude amount Qx that satisfies expression (2), the range determined by the moving velocity and the vibration frequency at which cutting of the sheet metal W is possible can be obtained by only the fixed amplitude amount Qx.

When the moving velocity of the machining head 35 in the vibration frequency f80 at the time the plate thickness t is 8 mm in FIG. 7 and FIG. 8 are compared, the moving velocity is higher when the amplitude amount Qx is minimum than when the amplitude amount Qx is maximum. This is for the following reason. Of the circular region bottom 86 shown in FIG. 6B, a part at a rear side in the cutting advancing direction from the cutting front CF gives useless heating to the sheet metal W. Accordingly, a heating time period to a spot requiring heating becomes short, and therefore a maximum speed of the moving velocity is lower when the amplitude amount Qx is maximum.

Further, when the minimum frequencies f41min to f45min at the time the plate thickness t is 4 mm in FIG. 7 and FIG. 8 are compared, the vibration frequency is higher when the amplitude amount Qx is maximum than when the amplitude amount Qx is minimum. This is for the following reason. Of the circular region bottom 86, heating by the part at the rear side in the cutting advancing direction from the cutting front CF acts to increase dross. Therefore, it is possible to suppress increase in dross by increasing the vibration frequency and shortening the heating time period of one time.

The NC device 50 refers to the machining condition stored in the machining condition database 70, and controls the moving mechanism to relatively move the machining head 35 at the moving velocity selected based on the referenced machining condition. Along with this, the NC device 50 controls the galvano scanner unit 32 to vibrate the laser beam at the vibration frequency selected based on the referenced machining condition.

As a first example, an operator can operate the operation section 40 and set the moving velocity of the machining head 35. When the operator sets a maximum moving velocity at which cutting of the sheet metal W is possible, the NC device 50 can vibrate the laser beam at one specific vibration frequency at which cutting of the sheet metal W is possible, by the galvano scanner unit 32.

Further, when the operator sets the moving velocity at more than or equal to the minimum moving velocity at which cutting of the sheet metal W is possible and is less than the maximum moving velocity, the NC device 50 can vibrate the laser beam at any frequency between the maximum frequency and the minimum frequency at which cutting of the sheet metal W is possible, determined according to each moving velocity, by the galvano scanner unit 32. The NC device 50 preferably vibrates the laser beam at the maximum frequency at which cutting of the sheet metal W is possible.

When the operator sets a moving velocity larger than the maximum moving velocity or a moving velocity smaller than the minimum moving velocity at which cutting of the sheet metal W is not possible, the NC device 50 may indicate on a display not illustrated that machining is not possible, and control the laser machining apparatus 100 so as not to start cutting of the sheet metal W.

As a second example, the operator may set a set of the moving velocity of the machining head 35 and the vibration frequency by operating the operation section 40. When the NC device 50 determines that it is possible to cut the sheet metal W by the set of the moving velocity and the vibration frequency, the NC device 50 controls the laser machining apparatus 100 so as to cut the sheet metal W. When the NC device 50 determines that it is not possible to cut the sheet metal W by the set of the moving velocity and the vibration frequency, the NC device 50 indicates on the display not illustrated that machining is not possible, and control the laser machining apparatus 100 so as not to start cutting of the sheet metal W.

As above, according to the laser machining apparatus and the laser machining method of the second embodiment, it is possible to select the vibration frequency at the time of vibrating the laser beam in the parallel vibration pattern, in an appropriate range, and cut the sheet metal made of stainless steel of each kinds of plate thicknesses.

It is not necessary to satisfy both of the amplitude amount of the laser beam described in the first embodiment described above, and the vibration frequency of the laser beam described in the second embodiment, and it is sufficiently effective to satisfy only one of the amplitude amount and the vibration frequency. Certainly, it is preferable to satisfy both the amplitude amount of the laser beam described in the first embodiment, and the vibration frequency of the laser beam described in the second embodiment.

As will be described later, it has become clear that when the sheet metal W is cut by the laser machining apparatuses and the laser machining methods of the first and second embodiments, it is possible to enhance the machining speed as compared with when the sheet metal W is cut by a normal machining method that does not vibrate a laser beam. In the laser machining apparatuses and the laser machining methods of the first and second embodiments, it is possible to irradiate the sheet metal W with the laser beam in a state of just focus, and therefore it is possible to enhance the machining speed.

According to a normal machining method, maximum machining velocity (maximum moving velocity) at the time of the plate thicknesses of 4 mm, 6 mm, and 8 mm are respectively 50.0 mm/s, 23.3 mm/s, and 10 mm/s. According to the machining methods according to the first and second embodiments, maximum machining velocity at the time of the plate thicknesses of 4 mm, 6 mm, and 8 mm are respectively 111.7 mm/s, 54.2 mm/s, and 33.3 mm/s with the case of the minimum amplitude amount Qx shown in FIG. 7 taken as an example.

Here, so-called middle plates of plate thicknesses of the sheet metals W of 4 mm, 6 mm, and 8 mm are taken as examples, but it is possible to similarly cut even in a case of a plate thickness of 3 mm, a middle plate thicker than the plate thickness of 8 mm, or a thick plate of a plate thickness of 10 mm or more. In the case of any plate thickness, the range determined by the moving velocity and the vibration frequency at which cutting of the sheet metal W is possible is experimented in advance, and can be stored in the machining condition database 70 as the machining condition.

According to the laser machining apparatuses and the laser machining methods of the first and second embodiments, even when the plate thickness of the sheet metal W is 3 mm or more, it is possible to cut the sheet metal W with good quality of the cut surface, as is known from examples described later. Further, according to the laser machining apparatuses and the laser machining methods of the first and second embodiments, it is possible to make the machining speed a higher speed than by cutting according to the conventional laser machining apparatus and laser machining method.

Implementation Examples

FIG. 9 illustrates specific examples shown by numbers 1 to 12. FIG. 9 shows a dross height, and arithmetic mean roughness Ra as an example of surface roughness, when the sheet metals W of the respective plate thicknesses are cut under illustrated conditions with a laser output of the laser oscillator 10 set as 4 kW or 2 kW. An upper part in the arithmetic mean roughness Ra shows arithmetic mean roughness Ra of a cut surface at a position of 1 mm from a surface of the sheet metal W, and a lower part shows a largest value of the arithmetic mean roughness Ra at a position of 1/3, or a position of 2/3, of the plate thickness from the surface of the sheet metal W, or a position of 1 mm from a lower surface, as the arithmetic mean roughness Ra of the cut surface.

Note that an evaluation method of the above described arithmetic mean roughness Ra is based on the measurement method specified in the international standard ISO9013, and evaluates the arithmetic mean roughness Ra by adding measurement of the position of 2/3 of the plate thickness and the position of 1 mm from the bottom surface to this basic measurement method.

Determination of whether the quality of the cut surface is good or bad changes depending on the plate thickness. For example, when the plate thickness is 3 mm, quality of the cut surface can be determined as good if the dross height is less than or equal to 0.1 mm, and the arithmetic mean roughness Ra is less than or equal to 4.9 µm. When the plate thickness is 12 mm, the quality of the cut surface can be determined as good if the dross height is less than or equal to 0.5 mm, and the arithmetic mean roughness Ra is equal to or less than 19.6 µm. As illustrated in FIG. 9, in all examples of numbers 1 to 12, the qualities of the cut surfaces are good.

As illustrated in FIG. 10, it is known that in both cases where the laser output of the laser oscillator 10 is set at 4 kW, and is set at 2 kW, the sheet metal W made of stainless steel can be cut at a high speed by using the parallel vibration pattern.

By satisfying at least one, or preferably both of the amplitude amount of the laser beam described in the first embodiment, and the vibration frequency of the laser beam described in the second embodiment, it is possible to cut the sheet metal W with good quality of the cut surface and at a high speed.

The present invention is not limited to the first and second embodiments described above, and can be variously changed within the range without departing from the summary of the present invention.

The disclosure of this application relates to the subject described in Japanese Patent Application No. 2018-128772 filed on Jul. 6, 2018, the entire disclosed contents of which are incorporated herein by reference.

The invention claimed is:
1. A laser machining apparatus, comprising:
a machining head configured to emit a laser beam for cutting sheet metal of stainless steel;

a moving mechanism configured to move the machining head relatively to a surface of the sheet metal;

a beam vibrating mechanism configured to vibrate the laser beam in a parallel direction with a cutting advancing direction of the sheet metal when cutting the sheet metal by relatively moving the machining head by the moving mechanism;

a database configured to store, as a machining condition, a relationship between a moving velocity at a time of relatively moving the machining head by the moving mechanism, and a vibration frequency of the laser beam by the beam vibrating mechanism, the moving velocity and the vibration frequency being obtained in advance for each plate thickness of the sheet metal, cutting of the sheet metal being achieved at the moving velocity and the vibration frequency; and a control device configured to control the moving mechanism to relatively move the machining head at a moving velocity selected based on the machining condition, and control the beam vibrating mechanism to vibrate the laser beam at a vibration frequency selected based on the machining condition, wherein in the machining condition, a single specific vibration frequency at which cutting of the sheet metal is achieved is set to a maximum moving velocity at which cutting of the sheet metal is achieved, and a plurality of vibration frequencies from a maximum frequency to a minimum frequency at which cutting of the sheet metal is achieved are set to the moving velocity more than or equal to a minimum moving velocity and less than the maximum moving velocity at which cutting of the sheet metal is achieved, and the control device controls the beam vibrating mechanism to vibrate the laser beam at the specific vibration frequency when relatively moving the machining head at the maximum moving velocity, and controls the beam vibrating mechanism to vibrate the laser beam at a vibration frequency selected from the plurality of vibration frequencies from the maximum frequency to the minimum frequency, when relatively moving the machining head at any moving velocity more than or equal to the minimum moving velocity and less than the maximum moving velocity.

2. The laser machining apparatus according to claim 1,
wherein the beam vibrating mechanism vibrates the laser beam to satisfy $$\Delta L - r_{bottom} - r_{top} \leq Q_x \leq \Delta L,$$

where an amplitude amount of the laser beam by the beam vibrating mechanism is $Q_x$, a radius of a first circular region having an area occupying 86% light energy at a center side of total light energy in a sectional area of the laser beam on a top surface of the sheet metal is $r_{top}$, a radius of a second circular region having an area occupying 86% light energy at a center side of total light energy in a sectional area of the laser beam on a bottom surface of the sheet metal is $r_{bottom}$, and a distance in a direction along a surface of the sheet metal of a cutting front is $\Delta L$.

* * * * *